(12) United States Patent
Jaghori et al.

(10) Patent No.: US 9,161,070 B2
(45) Date of Patent: Oct. 13, 2015

(54) SYSTEM AND METHOD FOR PRIVATE ONLINE SOCIAL NETWORKING SYSTEM AND FOR TIME RELEASING PRE-RECORDED DIGITAL CONTENT

(71) Applicants: A J Jaghori, Ashburn, VA (US); Shamiyana Khalili, Ashburn, VA (US)

(72) Inventors: A J Jaghori, Ashburn, VA (US); Shamiyana Khalili, Ashburn, VA (US)

( * ) Notice: Subject to any disclaimer, the term of this patent is extended or adjusted under 35 U.S.C. 154(b) by 0 days.

(21) Appl. No.: 14/138,955

(22) Filed: Dec. 23, 2013

(65) Prior Publication Data
US 2014/0181852 A1 Jun. 26, 2014

Related U.S. Application Data

(60) Provisional application No. 61/745,767, filed on Dec. 25, 2012, provisional application No. 61/789,471, filed on Mar. 15, 2013.

(51) Int. Cl.
| H04N 7/10 | (2006.01) |
| H04N 7/16 | (2011.01) |
| G06F 15/16 | (2006.01) |
| H04N 21/262 | (2011.01) |
| H04N 21/254 | (2011.01) |
| H04N 21/258 | (2011.01) |
| H04N 21/2743 | (2011.01) |

(52) U.S. Cl.
CPC ....... *H04N 21/2625* (2013.01); *H04N 21/2541* (2013.01); *H04N 21/25866* (2013.01); *H04N 21/2743* (2013.01)

(58) Field of Classification Search
CPC .......................... H04N 7/163; H04N 21/812
USPC ...................................... 725/30, 34; 709/206
See application file for complete search history.

(56) References Cited

U.S. PATENT DOCUMENTS

2013/0060874 A1* 3/2013 Stephens ........................ 709/206
2013/0325976 A1* 12/2013 Mansfield et al. ............. 709/206

* cited by examiner

*Primary Examiner* — Nathan Flynn
*Assistant Examiner* — Sumaiya A Chowdhury

(57) ABSTRACT

A private online social networking system and method that provides time released dispersal of pre-recorded digital video and images wherein users record digital content such as videos and images at a first time, select from several system-generated, user specific criterion for future time release of the digital content to pre-selected recipients via the system or other third party services such as social networks.

19 Claims, 9 Drawing Sheets

SYSTEM AND METHOD FOR PRIVATE ONLINE SOCIAL NETWORKING SYSTEM AND FOR TIME RELEASING PRE-RECORDED DIGITAL CONTENT

PRIORITY

This application claims priority to U.S. Provisional Patent Application No. 61/745,767 filed on 25 Dec. 2012, and U.S. Provisional Patent Application No. 61/789,471 filed on 15 Mar. 2013, which is herein incorporated by reference in its entirety.

BACKGROUND

1. Technical Field

The Disclosure relates generally to the creation and management of a private online social networking system and more specifically to the time released dispersal of pre-recorded social networking content wherein the user creates digital video and images directly from a smartphone, tablet, personal computer, or other capable computing device that is securely uploaded and automatically time released based on system generated future criterion.

2. Background

According to the Go-Gulf.com 2012 worldwide statistics: 80% of humans own a mobile phone, there are 91.4 million smartphones in the United States alone, out of the 5 billion mobile phones in the world, 1.08 billion are smartphones, and 9 out of 10 smartphone users use their phone on a daily basis. In Feb. 16, 2012 The Consumer Electronics Association (CEA) reported that consumers who are supplementing their digital photography with devices like smartphones and tablets and consider their smartphone to be their primary device for their photography needs has tripled in two years to 18 percent. Although consumers value the quality of digital cameras and camcorders, they do not want to miss out on great moments that are easily captured by smartphones and tablets and spontaneously shared.

The average user spends 128 minutes on their smartphone every day according to a survey conducted by European telecom 2 Jul. 2012. Checking social networks and camera usage (i.e. taking digital photos and recording digital videos) ranks among the top activities.

With the advancements in infrastructure and Internet coupled with the surge in global smartphone and tablet usage, access to social networks continually grow at a rapid pace spanning global demographics and socio economics.

Current social network systems lack real privacy and do not offer users the ability to securely store digital content. For example, once users upload photos to Facebook, it automatically becomes the property of Facebook and allows the social network to use all of the meta data associated with it, including location, places nearby, the date time and even who's in the photo. Among other things, the data is used to create user-targeted ads and sold to advertising companies. Content that is private to users such as a sentimental video recorded for a child or an image intended for a single end recipient becomes exposed and runs the risk of being leaked or compromised.

Current social network systems simply allow users to upload, disseminate, and share digital content such as video and images to friends/affiliates and the general public in the present state.

Various device vendors (i.e. Apple, Google) and third party providers allow users to automatically store and retrieve digital content directly from smartphone, tablets, and computing devices, however, these vendor and third party systems are limited to simplified storage and retrieval of digital content and do not offer intelligent methods such as time releasing the digital content for future events.

Current social network systems prohibit direct access to another user's social network content. Even in the event of a user's demise, only verified family members or affiliates can preserve and in some cases delete a dead user's social network content; ergo, dispersal of the dead user's digital content is not possible.

Collectively, these advancements in technology and voids in social network systems present a need for a simplified private online social network system and method that provides users the ability to pre-record digital video and images directly from a smartphone, tablet, personal computer, or other capable computing device and automatically time release it based on system generated future criterion.

BRIEF SUMMARY OF THE DISCLOSURE

The disclosure relates to an online social networking system and method for time releasing pre-recorded digital content. Users register and access the system through the smartphone or tablet application or website. Upon accessing the system, users are prompted to record digital videos and images directly from their smartphone, tablet, personal computer, or other capable computing device. The system suggests criterion to record the content for future delivery, such as user specific life events, special occasions, daily life activities, and other future events based on demographics, lifestyle, and location. The criterion is derived from information obtained from the user's registration or shared through third party services. Users select one of the system suggested criterion or input a custom one. Users then create digital videos and/or images in the present state. The system automatically catalogs the videos and images in correct queues based on the selected criterion. Once the content has been created, users then select the end recipients for the content. The end recipients can be selected from the system's local database, invitation to join the system and subsequently become an end recipient, third party, or manual entry. Upon selecting the end recipients, users then select the method of delivery for the content. Content can be delivered via the system or third party services. The content is then securely stored for future delivery. When the criterion is met, the content is released to the pre-selected end recipient via the pre-selected delivery method.

In an ideal manifestation of the disclosure, the system would be integrated with third party social networks such as Facebook, Twitter, LinkedIn, Google+, Orkut and others, current and future. The system would allow users the option to release digital content to these third party social networks.

In another ideal manifestation of the disclosure, the system would be integrated with external systems such as banks and insurance companies and allow for automated electronic notification based on future criterion, such as a user's demise. This notification would prompt a hold or closure of the users accounts, stopping fraudulent activities at the point of demise and in real time.

In yet another ideal manifestation of the disclosure, the system would have a public interface that would allow users the option to share their digital content with the public upon their demise. Such would be the case for public figures such as celebrities, politicians, and sports figures as well as military personnel, the elderly, the ill, individuals with high-risk jobs, and others.

In yet another ideal manifestation of the disclosure, the system would be integrated with a digital music service provider. This would allow the user to purchase and overlay music to recorded videos and images.

DETAILED DESCRIPTION

The present disclosure relates to a private online social networking system and method that provides time-released dispersal of pre-recorded digital video and images. The system and method of the disclosure allows users to create digital videos and images directly from their smartphone, tablet, personal computer, or other capable computing device then select from system generated criterion to deliver this digital content to designated end recipients. At the core of the disclosure is the notion that users can record videos and take images in the present state, select from several system-generated criterion that would allow for future time release of the videos and images to pre-selected recipients by way of the system or third party services.

As an example of this approach, assume on Monday a user records a video and take a pictures on their smartphone. The user can log into the private on-line networking system and choose criterion for releasing the video and/or a picture in the future. The criterion can include a number of different parameters such as the social network (twitter, Facebook, Instagram, etc.), the selected recipients (my sister, parents, best friend, soccer team, etc.), and a timing of the release. For example, assume the user who on Monday has a picture of her and her sister desires to post that picture on her sister's Facebook page on Friday, which is her sister's birthday. The criterion chosen will enable the controlled release of that picture at the timing she desires. Then, the user will not have to remember to do the posting manually herself on Friday. There can be several timings too. For example, she could choose to post the picture on her sister's page Friday and then her parents Facebook page on the following Tuesday.

A system embodiment includes various hardware components generally known in computing devices. These includes, but are not limited to, processors (graphical or central processors, virtual processors or other types of processors), a system bus, memory of all types, input and output components such as keyboards, touch sensitive displays, microphones, speakers, and so forth. Any desktop, handheld, tablet, mobile, or any other type of device now know or developed in the future can be included within the scope of a system embodiment. Typically a system will generally include a processor and a computer-readable storage medium or device which stores computing instructions which, when executed by the processor, cause the processor to perform various functions or operations as disclosed herein.

Figure 1:
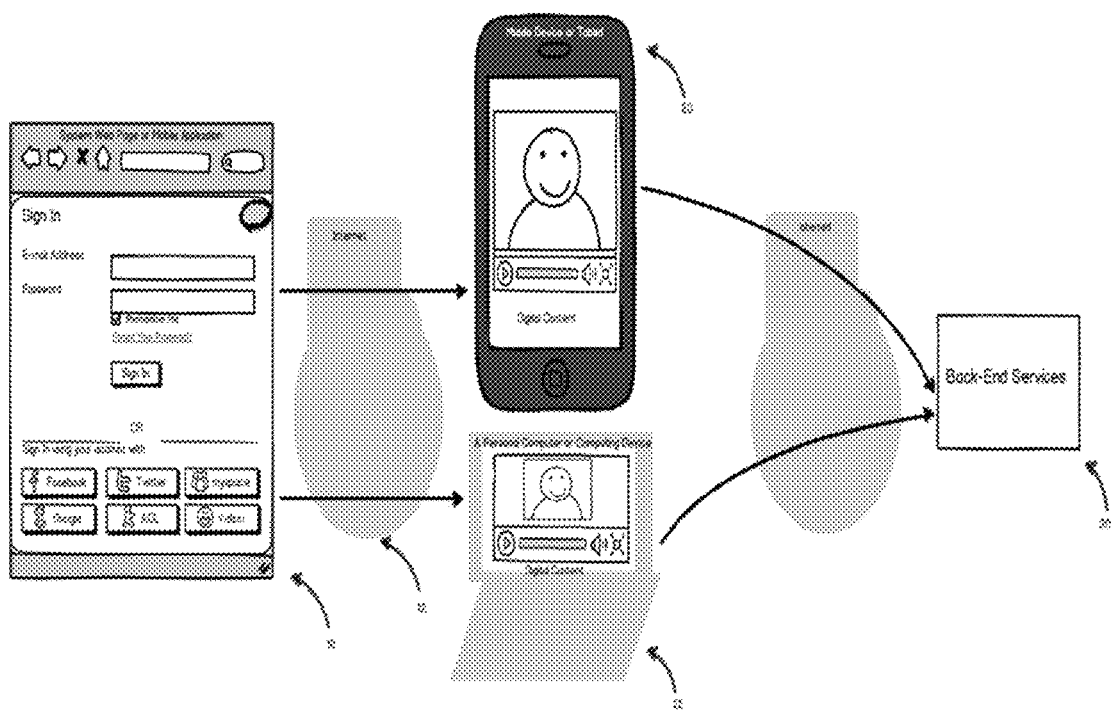
FIG. 1 is a schematic diagram illustrating the user's connectivity to the system.

Referring now to figures, specifically FIG. 1, a schematic diagram illustrating the user's connectivity to the system. The system web page and mobile application 10 are configured to connect to the mobile device or tablet 20 or a personal computer or other computing device 22 via the Internet 12. Other networks such as a cellular network or any other type of connectivity could be utilized. Once a session is successfully established between the device and application, connectivity is then established to the back-end services 30.

Figure 2:
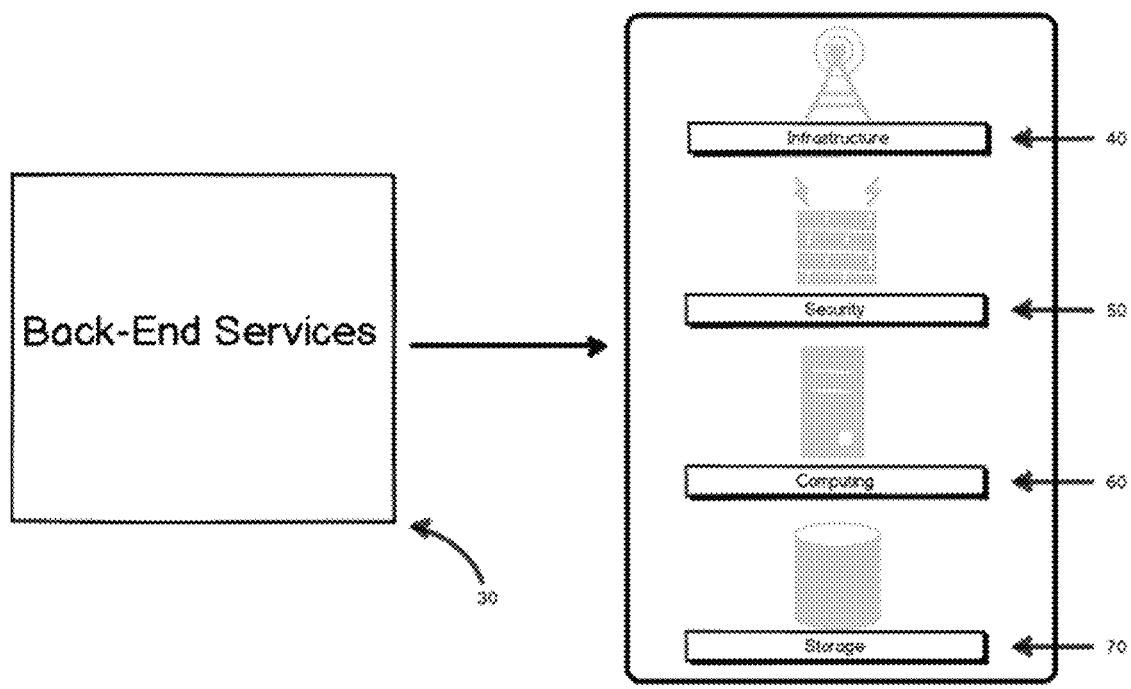
FIG. 2 is a block diagram illustrating the back-end services of the system.

As shown in FIG. 2, the back-end services 30 include the system's infrastructure 40, security 50, computing 60, and storage 70 components. These components collectively make-up the core services of the system.

Figure 3:
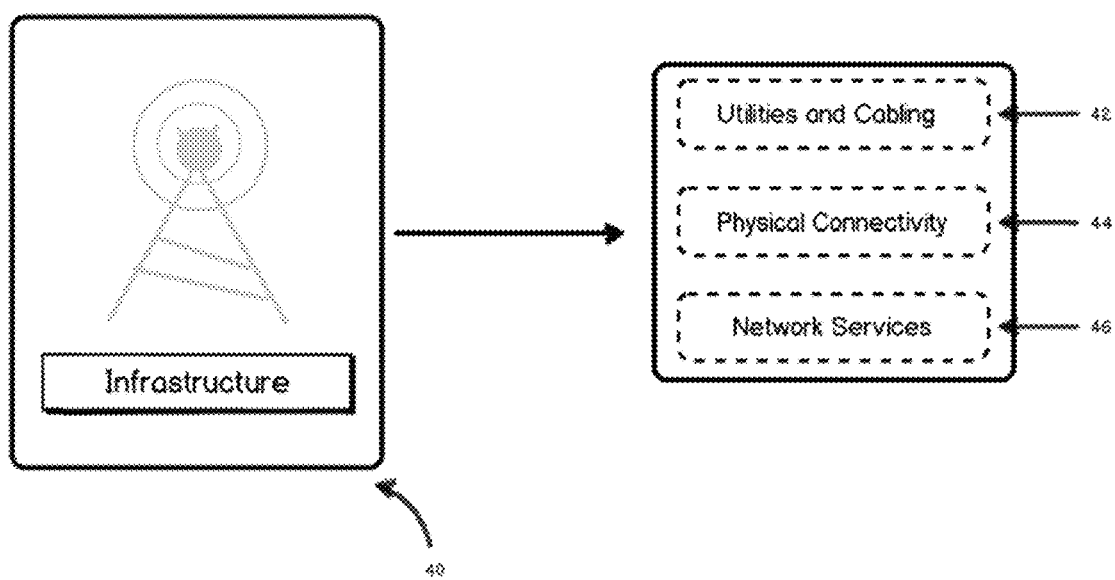
FIG. 3 is a block diagram illustrating the infrastructure components of the system.

Referring now to the components of the back-end services 30: FIG. 3 is a block diagram illustrating the infrastructure components of the system that includes standard utilities and cabling 42, physical connectivity 44, and network services 46.

Figure 4:
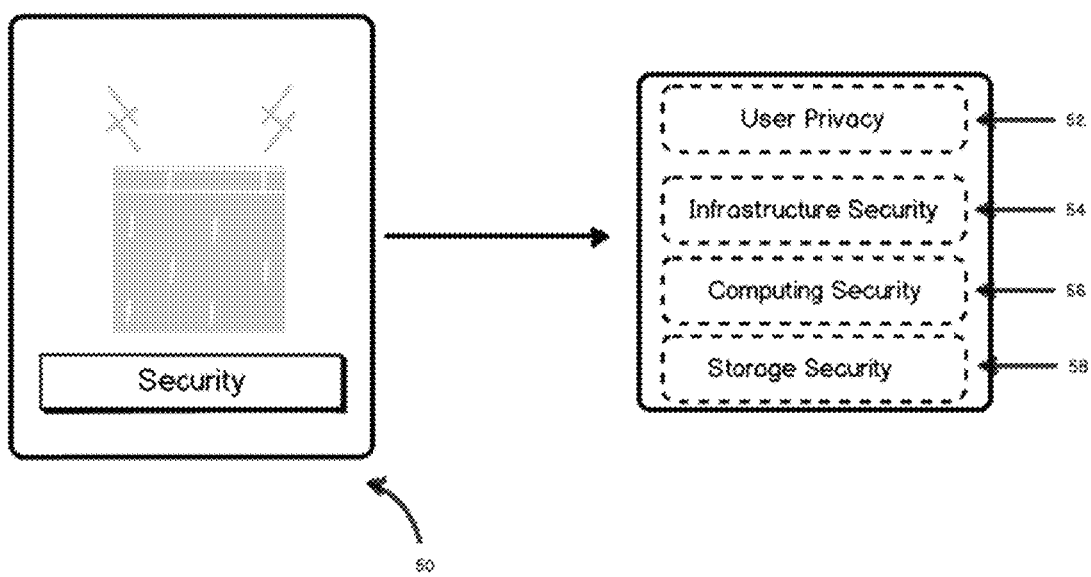
FIG. 4 is a block diagram illustrating the security components of the system.

FIG. 4 is a block diagram illustrating the security components of the system that includes user privacy policies 52, infrastructure security 54, computing security 56, and storage security 58.

Figure 5:
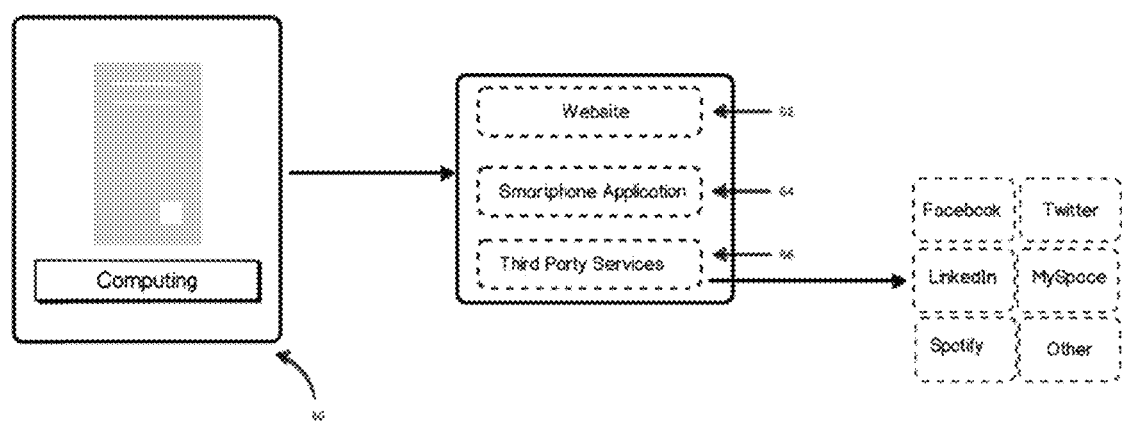
FIG. 5 is a block diagram illustrating the computing components of the system.

FIG. 5 is another block diagram illustrating the computing components of the system that includes the system website 62, system mobile application 64, and third party services 66 such as social networking systems (i.e. Facebook®, Twitter®) that will be integrated with the system.

Figure 6:
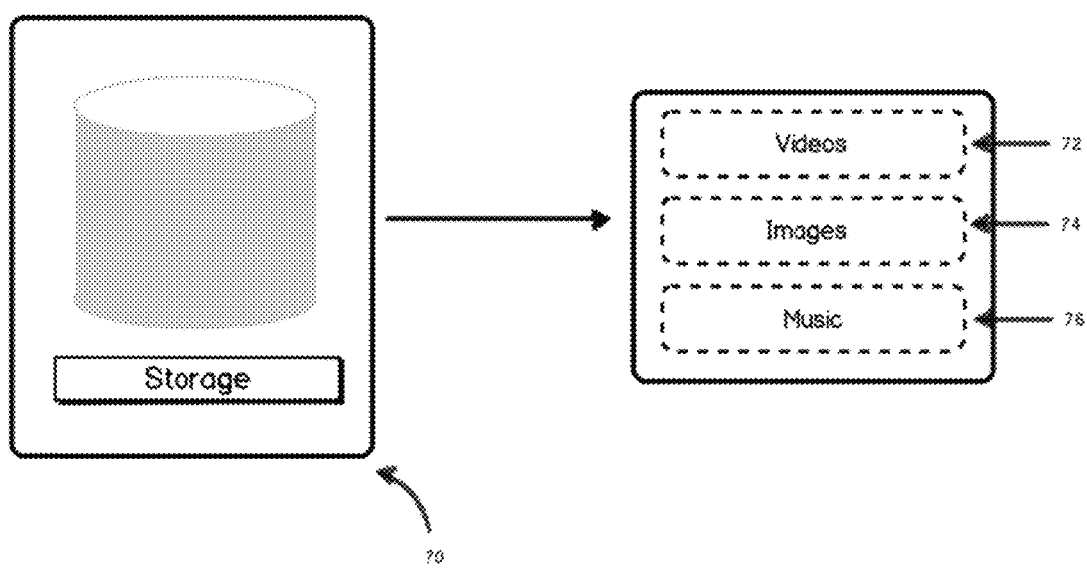
FIG. 6 is a block diagram illustrating the storage components of the system.

FIG. 6 is yet another block diagram and final component of the back-end services 30, illustrating the storage 70 components of the system that includes the offsite repositories for videos 72, images 74, and music 76.

Figure 7:
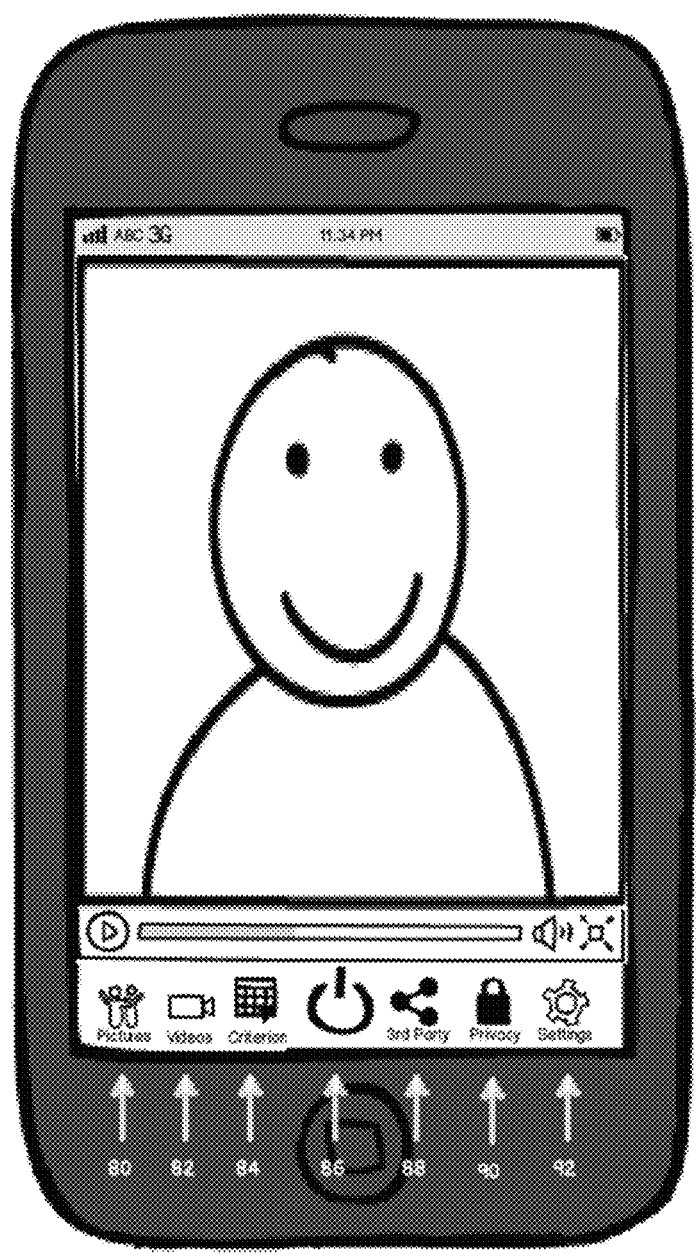
FIG. 7 is an exemplary graphical user interface (GUI) of the smartphone application.

FIG. 7 is an exemplary graphical user interface (GUI) of the smartphone application. In this embodiment, the GUI is depicting the features of the system that includes the image folder 80 displaying images remotely stored in the back-end storage 70, video folder 82 displaying videos remotely stored in the back-end storage 70, criterion for the created videos and images 84 generated by the system, $3^{rd}$ party services 66 that are integrated with the system 88 such as social networks, privacy settings 90 for the content, it's use, and delivery and additional application settings 92 as allowed by the smartphone operating system, i.e. Apple®, Android®, Blackberry®, Windows®, Amazon®, and others.

Figure 8:
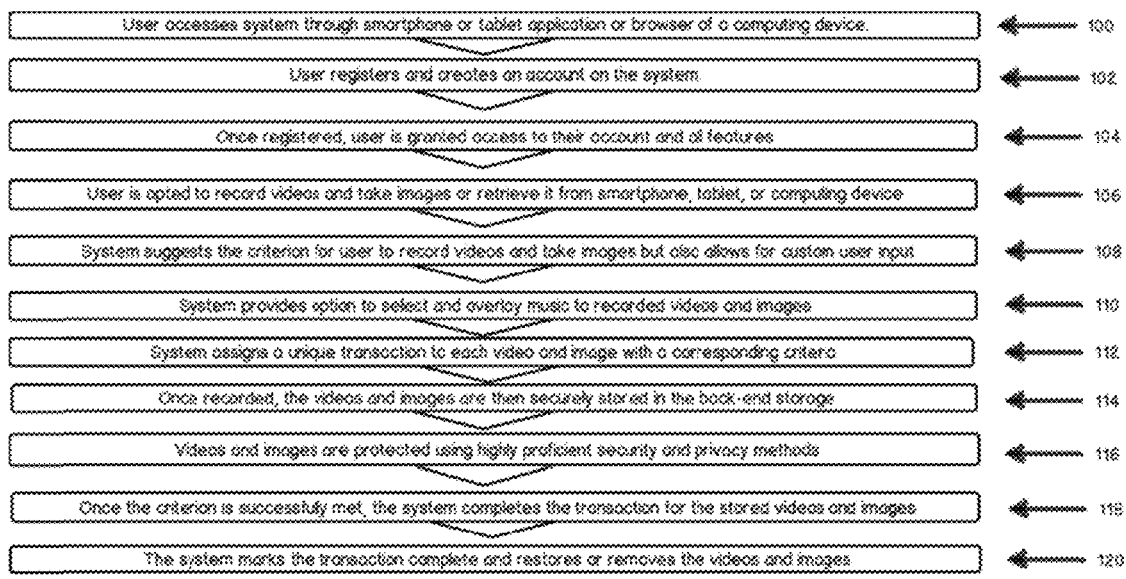
FIG. 8 is a flow diagram of the user's interaction with the system.

FIG. 8 is a flow diagram of the user's interaction with the system. In this embodiment, the user accesses the system through the smartphone application, tablet application, or the browser of a personal computer or other capable computing device 100. The user then registers and creates an account on the system 102. The registration consists of identifiable user information as well as additional information that will help the system in generating and subsequently suggesting criterion for creating different types of digital videos and images 108. Once registered, the user is granted access to their system account 104 and all available features, some of which are depicted in the exemplary graphic user interface (GUI) in FIG. 7. User is then opted to record videos and take images or retrieve it from smartphone, tablet, or computing device memory 106. At this point, the system provides an option to overlay music to recorded videos and images 110. The system is integrated with a digital music service provider to allow the selection or purchase of music. The system then assigns a unique transaction to each video and image with a corresponding criterion 112. Once recorded, the videos and images are then securely stored in the back-end storage 114 via the back-end storage services 70. Videos and images are protected using highly proficient security and privacy methods 116 using the back-end security services 50. Once the criterion is successfully met, the system completes the transaction for the stored videos and images 118. Of course the system may process a single video or a single photo. Other things can be processed in this system too, like text messages, emails, advertisements, etc. The system then marks the transaction complete and restores or removes the videos and images accordingly 120.

Figure 9:
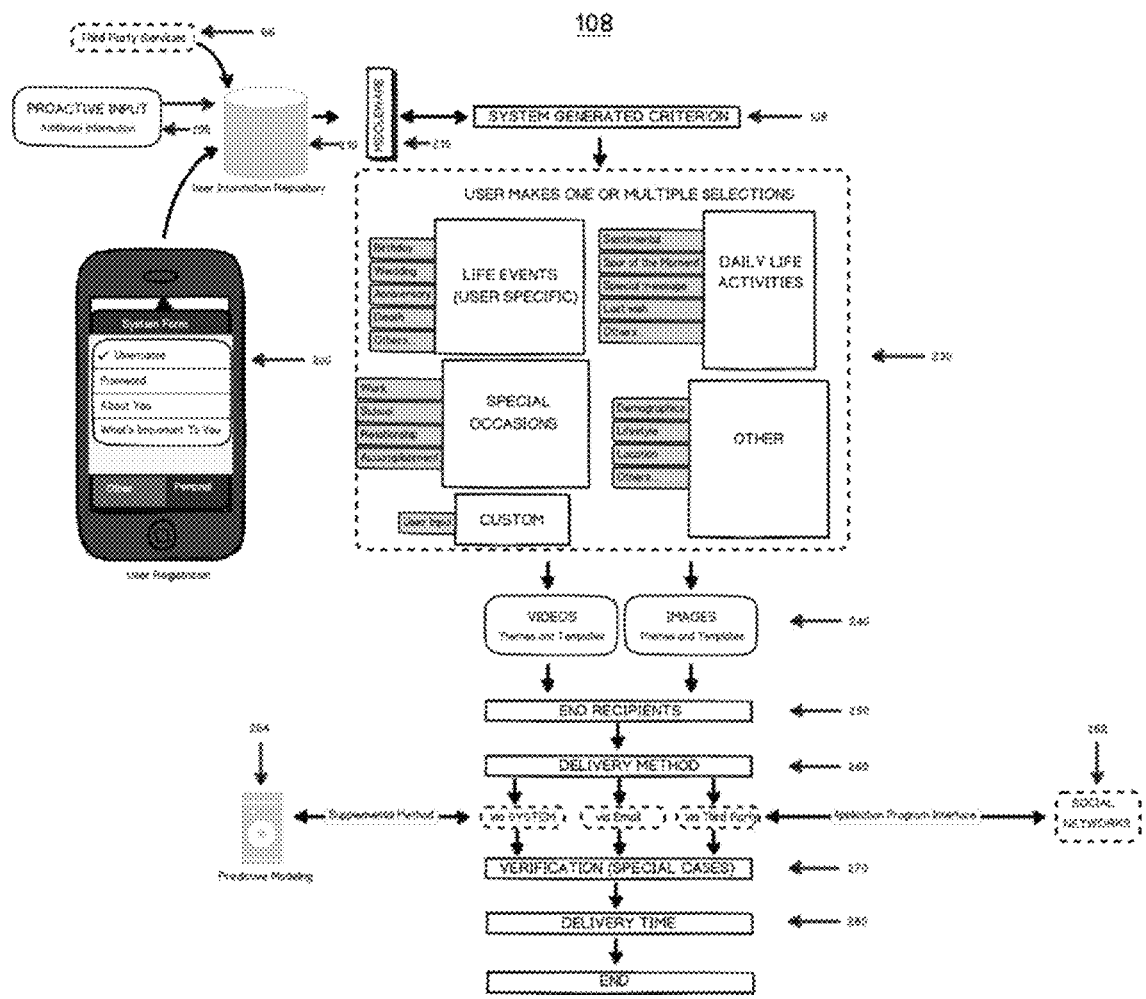
FIG. 9 is a flow diagram for the system criterion.

FIG. 9 is a flow diagram illustrating the process of the system criterion 108. Users complete a system form 200 by going through several identifiable and unique questions, in addition to standard registration fields. Alternatively, users can register through third party services 66 such as social networks (i.e. Facebook®, Twitter®) and grant the system permission to obtain information to populate the system form. Additionally, users are proactively prompted for additional input 205 to achieve more accurate system generated criterion. Information gathered from the three sources 200, 205, 66 is populated into the user information repository 210 where each user has a unique living system profile/record. Once a user's profile/record is created, his/her information is continually analyzed and learned through middleware software 215. This information is then translated into criterion that is used by the system 108 to suggest user specific life events, special occasions, daily life activities, and other future events based on demographics, lifestyle, and location 230. The criterion is presented to the user for selection in the form of themes and templates (optimized for the smartphone application and system website respectively) 240 that thematically and visually corresponds to each criterion.

Once the criterion has been selected in the form of a theme or template, the user selects end recipients 250 from the system's existing user database or sends an invitation to the end recipients to join the system and subsequently become an end recipient of the pre-recorded digital content. The invitation is sent via the system or third party services such as Facebook®. Next, the system automatically designates the delivery method 260 via the system, email, or third party services such as social networks 262 where the system integrates with social network sites like Facebook® through it's publicly available Application Programming Interface (API). The system also allows for a supplemental method 264 for delivering content to end recipients that presently do not have an online presence (or digital footprint) but may possess one in the future such as children. Through a parameterized predictive modeling, the system uses a proactive learning algorithm that can find matching parameters, structure, interactions, and relationships from large data sets gathered from identifiable input from the user and publically available online data. For those special future criterion (or cases) where verification is needed to confirm delivery of the content in addition to or absence of the user's verification, the system provides additional verification 270. One exemplary case is when a user selects the future criterion to pre-record digital videos and images for a child's birthday or wedding to be released in the event of his or her demise to pre-selected end recipients. The system will allow the user to preselect two or more verifiers (users from the system). When a user selects future criterion and the verifiers, the system generates a unique code and asks the verifiers to honor the user's request by reporting back to subsequently process the timely release of the digital content. Lastly, the system generates a valid delivery time 280 based on the user's selected criterion. The system then marks the transaction complete and restores or removes the videos and images accordingly 120.

The plurality of criterion includes a time for delivering the media, an event which, upon occurrence of the event, triggers the delivering of the media, a privacy threshold, a recipient group characterization, a recipient designation, and a social media for delivering the media. The event could encompass any event that the system can monitor or receive data that the event has occurred. For example, the death of the user, a holiday, a traffic jam, a weather event such as a hurricane, etc. Any event that the system can receive data about can be a triggering event that would cause the delivery of the media to the selected recipient or recipients. The recipient group characterization could be your soccer team, your family, your extended family including all cousins and aunts and uncles, or friends over the age of 14. It can include characterizations such as work group plus friends having a closeness criterion of 7 out of 10 (i.e., relatively good friends).

In another example the private online social networking system that provides time released dispersal of pre-recorded digital video and images includes the following features. A web page and mobile application is configured to connect to mobile devices, tablets, personal computers or other computing devices via the Internet. The back-end services provide the system's infrastructure, security, computing, and storage components. A module within the system enables the creation of a living system profile/record for each user and the ability to receive recorded media such as videos, pictures, texts, etc. at a first time. The user can select a plurality of system-generated criterion and/or user-defined criteria that allows for future delivery of the media to selected end recipients. The system enables the user to select the end recipient of the media. Once the media is identified, the criterion for delivery, and the end recipient, the system manages the delivery of the media content to the selected recipient at a second time which is later than the first time and according to the criterion. The selected recipient may not at the first time have access to on-line services at the first time but may have access later than the first time. One of the events that the system monitors for triggering delivery could be related to the on-line access of the selected recipient.

The system can also provide additional verification for selected special feature criterion.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    receiving a recording of a media associated with a first time;
    selecting, via a processor, from a plurality of criterion associated with a delivery of the media to a selected recipient at a second time which is later than the first time to yield a selected criterion;
    designating a secure delivery mechanism for the media;
    allowing, via the processor, a user to preselect two or more user verifiers by generating a unique code and asking the two or more user verifiers to honor a user request by reporting back, to yield a report, for subsequently processing a timely release of the media; and
    delivering the media to the selected recipient at the second time which is later than the first time according to at least one of the selected criterion, the secure delivery mechanism and the report.

2. The method of claim 1, further comprising:
    providing additional verification for the selected criterion.

3. The method of claim 1, wherein the media comprises one of a video, an image, and a text message.

4. The method of claim 1, wherein the plurality of criterion comprises a time for delivering the media, an event which, upon occurrence of the event, triggers the delivering of the media, a privacy threshold, a recipient group characterization, a recipient designation, and a social media for delivering the media.

5. The method of claim 1, wherein a living system profile for each user is initially created through a system form comprising several standard, identifiable and unique questions tailored to one of each user and registration through third party services that will grant the system permission to obtain information to assist in populating the system form.

6. The method of claim 5, wherein the living system profile for each user is continually improved through user engagement and prompts for additional tailored questions throughout time to achieve more accurate system generated criterion.

7. The method of claim 1, wherein the plurality of criterion comprises a user-specific life event, a special occasion, a daily life activity, and a future event based on one of a demographic, a lifestyle, and a location.

8. The method of claim 1, wherein the selected recipient of the media is selected from an existing user database or via an invitation to end recipients to join and subsequently become an end recipient of the media.

9. The method of claim 1 wherein the media is automatically and securely delivered via email or a third party service.

10. The method of claim 1, further comprising delivering pre-recorded digital videos and images to the selected recipient that does not have an online presence but may possess one in the future through a parameterized predictive model that uses a proactive learning algorithm to find matching parameters, structure, interactions, and relationships from large data sets gathered from identifiable input from the user and publically available online data.

11. A system comprising:
    a processor; and
    a computer-readable storage medium storing instructions which, when executed by the processor, cause the processor to perform operations comprising:
        receiving a recording of a media associated with a first time;
        selecting, via a processor, from a plurality of criterion associated with a delivery of the media to a selected recipient at a second time which is later than the first time to yield a selected criterion;
        designating a secure delivery mechanism for the media;
        allowing a user to preselect two or more user verifiers by generating a unique code and asking the two or more user verifiers to honor a user request by reporting back, to yield a report, for subsequently processing a timely release of the media; and
        delivering the media to the selected recipient at the second time which is later than the first time according to at least one the selected criterion, the secure delivery mechanism and the report.

12. The system of claim 11, wherein the computer-readable storage media stores additional instructions which, when executed by the processor, cause the processor to perform a further operation comprising:
    providing additional verification for the selected criterion.

13. The system of claim 11, wherein the media comprises one of a video, an image, and a text message.

14. The system of claim 11, wherein the plurality of criterion comprises a time for delivering the media, an event which, upon occurrence of the event, triggers the delivering of the media, a privacy threshold, a recipient group characterization, a recipient designation, and a social media for delivering the media.

15. The system of claim 11, wherein a living system profile for each user is initially created through a system form comprising several standard, identifiable and unique questions tailored to one of each user and registration through third party services that will grant the system permission to obtain information to assist in populating the system form.

16. The system of claim 15, wherein the living system profile for each user is continually improved through user engagement and prompts for additional tailored questions throughout time to achieve more accurate system generated criterion.

17. The system of claim 11, wherein the plurality of criterion comprises a user-specific life event, a special occasion, a daily life activity, and a future event based on one of a demographic, a lifestyle, and a location.

18. The system of claim 11, wherein the selected recipient of the media is selected from an existing user database or via an invitation to end recipients to join and subsequently become an end recipient of the media.

19. A computer-readable storage device storing instructions which, when executed by a processor, cause the processor to perform operations comprising:
   receiving a recording of a media associated with a first time;
   selecting, via a processor, from a plurality of criterion associated with a delivery of the media to a selected recipient at a second time which is later than the first time to yield a selected criterion;
   designating a secure delivery mechanism for the media;
   allowing a user to preselect two or more user verifiers by generating a unique code and asking the two or more user verifiers to honor a user request by reporting back, to yield a report, for subsequently processing a timely release of the media; and
   delivering the media to the selected recipient at the second time which is later than the first time according to at least one of the selected criterion, the secure delivery mechanism and the report.

* * * * *